(No Model.)

L. J. SMITH.
PACKAGE FOR BUTTER.

No. 263,234. Patented Aug. 22, 1882.

WITNESSES:
Fred. G. Dieterich.
N. L. Collamer.

INVENTOR.
Lewis J. Smith
by C. A. Snow & Co.,
ATTORNEYS.

UNITED STATES PATENT OFFICE.

LEWIS J. SMITH, OF GRAPEVILLE, NEW YORK.

PACKAGE FOR BUTTER.

SPECIFICATION forming part of Letters Patent No. 263,234, dated August 22, 1882.

Application filed June 17, 1882. (No model.)

*To all whom it may concern:*

Be it known that I, LEWIS J. SMITH, of Grapeville, in the county of Greene and State of New York, have invented certain new and useful Improvements in Packages for Butter, &c.; and I do hereby declare that the following is a full, clear, and exact description of the invention, which will enable others skilled in the art to which it appertains to make and use the same, reference being had to the accompanying drawings, which form a part of this specification.

Figure 1:
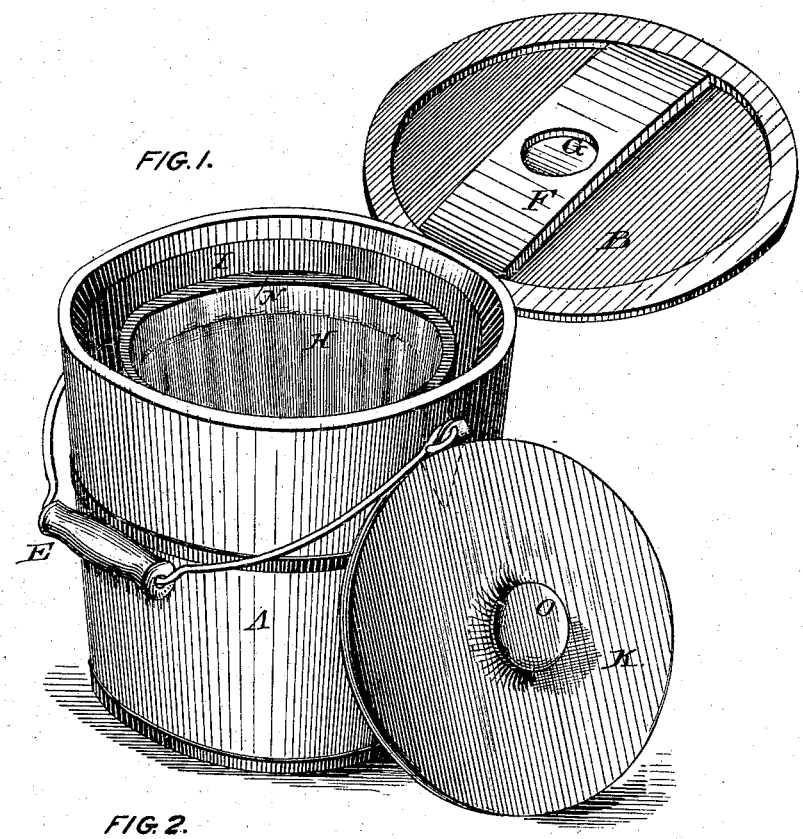
Figure 2:
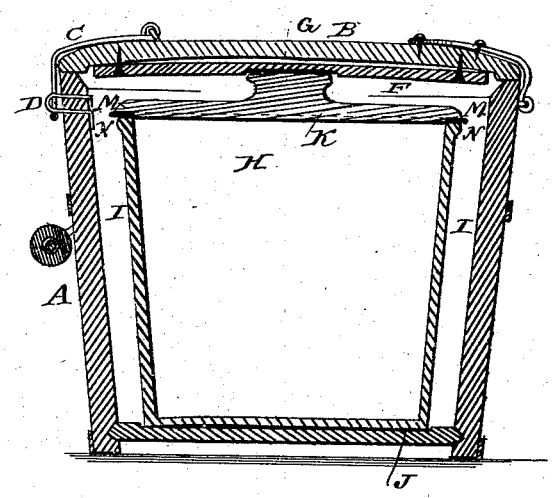

Figure 1 is a perspective view, showing my improved package open, and Fig. 2 is a vertical sectional view of the same closed.

Similar letters of reference indicate corresponding parts in both figures.

This invention relates to packages for butter, lard, honey, and other articles; and it consists in certain improvements in the construction of the same, which will be hereinafter fully described, and particularly pointed out in the claim.

In the drawings hereto annexed, A represents a bucket or vessel of suitable dimensions, having a hinged cover, B, provided with a hasp or clasp, C, adapted to engage a staple, D, upon the side of vessel A, and thereby secure the cover in a closed position. A handle, E, may be provided upon the bucket A.

Secured transversely upon the under side of the cover, which is made dishing or slightly concave, as shown, is a transverse spring-bar, F, consisting of a straight flat bar made of some suitable elastic material, preferably tough wood, and provided on its under side with a recess, G.

H is a jar or vessel, made of glass, earthenware, or other suitable material, somewhat smaller than the vessel A, within which it may be placed in such a manner that there shall be a vacant space, I, between the walls or sides of the two vessels. The bottom of vessel A is provided with a shallow recess, J, to receive the lower end of vessel H. The latter is provided with a removable flanged cover, K, between the flange of which, M, and the upper edge or rim of jar H a ring or gasket, N, of rubber may be placed in order to insure a tight joint. The cover K is provided with a central knob or button, O, registering with the recess G in the transverse elastic bar F upon the under side of the cover of vessel A.

The operation of my invention will be readily understood. When the inner vessel has been packed and placed in position in the outer one the cover of the latter may be closed, thus causing the spring-bar F to force the inner cover, K, down tightly. The dead-air space between the two vessels prevents the contents from being easily affected by changes in the temperature. I prefer to make the vessel A of wood and jar H of glass, porcelain, or earthenware; but any other suitable material may be used.

Having thus described my invention, I claim and desire to secure by Letters Patent of the United States—

The vessel A, having cover B, provided with a transverse spring-bar, F, having recess G, in combination with a detachable inner vessel, H, fitting in a shallow recess in the bottom of vessel A, and having detachable flanged cover K, provided with a central knob or button, O, registering with the recess G in spring-bar F, as set forth.

In testimony that I claim the foregoing as my own I have hereto affixed my signature in presence of two witnesses.

LEWIS J. SMITH.

Witnesses:
C. K. ALLEN,
WM. BAGGER.